United States Patent [19]

Bikker

[11] 4,160,960
[45] Jul. 10, 1979

[54] POWER-DIVIDING AND MODULATING ARRANGEMENT

[75] Inventor: Pieter Bikker, Hilversum, Netherlands

[73] Assignee: U.S. Philips Corporation, New York, N.Y.

[21] Appl. No.: 782,929

[22] Filed: Mar. 30, 1977

[30] Foreign Application Priority Data

Apr. 8, 1976 [NL] Netherlands .......................... 7603687

[51] Int. Cl.² ........................... H03C 1/08; G01S 1/38
[52] U.S. Cl. ........................................ 332/40; 332/41; 332/55; 333/17 M; 343/106 D
[58] Field of Search ................. 343/106 D; 332/37 D, 332/40, 41, 53, 55; 333/17 M

[56] References Cited

U.S. PATENT DOCUMENTS 3,448,453  6/1969  Earp et al. ........................ 343/106 D
3,882,425  5/1975  Briley ................................ 332/37 D

OTHER PUBLICATIONS

Philips Telecommunication Review, vol. 34, No. 1, Apr. 1976, pp. 1-10.

Primary Examiner—Maynard R. Wilbur
Assistant Examiner—Richard E. Berger
Attorney, Agent, or Firm—Algy Tamoshunas

[57] ABSTRACT

A power divider and modulator is disclosed comprising a HF signal source which supplies a carrier signal to a pair of ¼λ transformers each terminated with a variable impedance, whose impedance value is controlled by a modulating signal from a signal source. The amplitude of the carrier signal is modulated by a signal proportional to the sum of the two modulating signals to obtain a reflection free termination at the output of the HF signal source.

3 Claims, 4 Drawing Figures

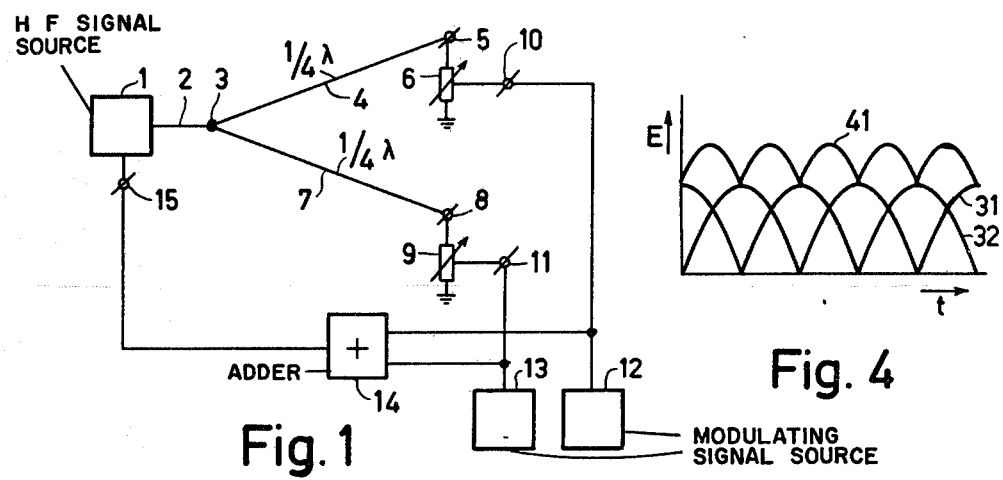
Fig. 1
Fig. 4
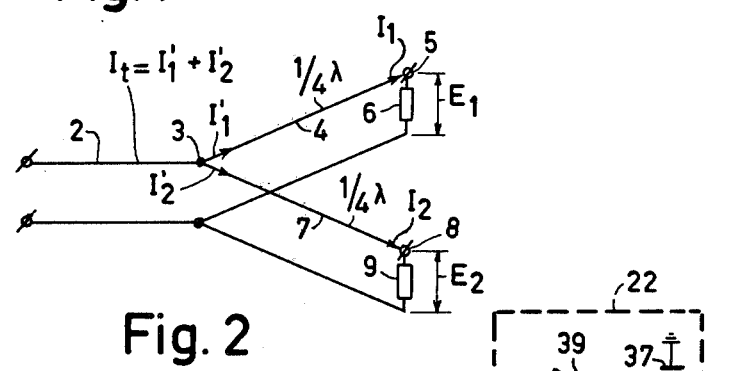
Fig. 2
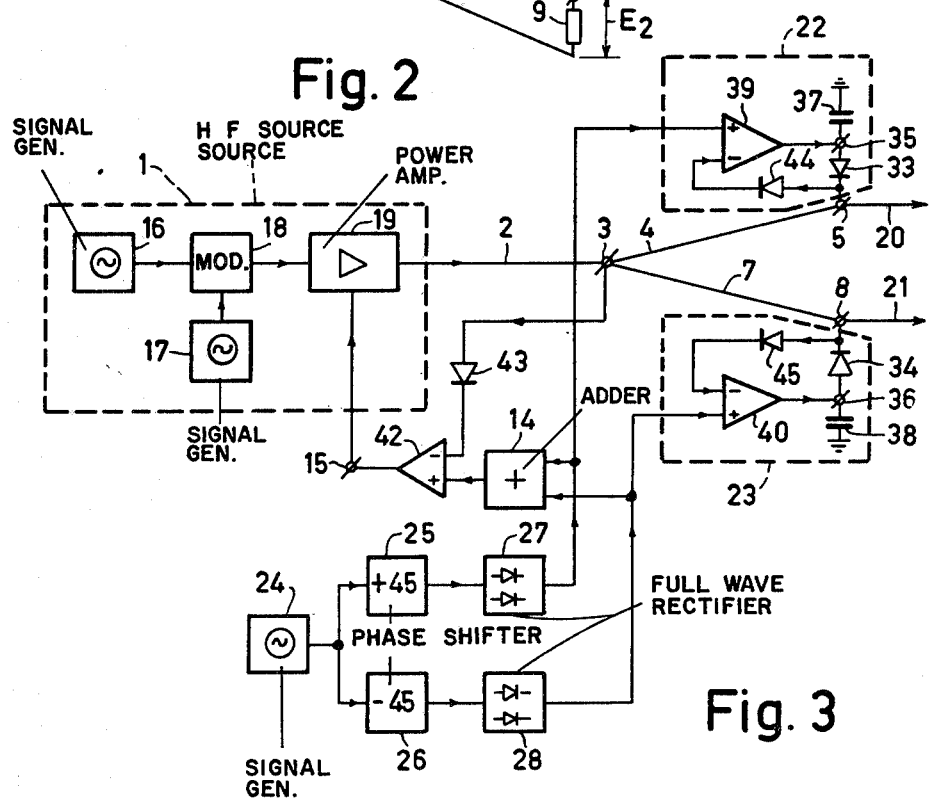
Fig. 3

POWER-DIVIDING AND MODULATING ARRANGEMENT

The invention relates to a power-dividing and modulating arrangement comprising a HF signal device for supplying a carrier signal, a common terminal coupled to the output of the HF signal device, at least two impedances which are connected by separate $\frac{1}{4}\lambda$-transformers to the common terminal and output terminals connected across the variable impedances. Each impedance is provided with a control input connected to a modulation signal source the values of the impedance being controlled by the modulation signals supplied by these sources.

Such an arrangement is used, inter alia, in radio navigation systems for determining the azimuth, particularly in a so-called "Doppler Very High Frequency Omnirange Radio" (DVOR) system. In a double-sideband Doppler VOR system the transmitting device comprises an omnidirectional antenna which is placed in the centre of a circle and which radiates a carrier signal whose amplitude is modulated with a 30 Hz signal and a plurality of antennas, for example 48, equidistantly distributed along the circumference of the circle which radiate a directional radiation pattern rotating at a speed of 30 Hz, the rotation being effected by sequentially activating pairs of diametrically situated antennas, an upper sideband signal being supplied to one antenna of a pair and to the other antenna a lower sideband signal of the carrier signal modulated by a 9960 Hz auxiliary signal. The phase of the 30 Hz signal of the omnidirectional radiation pattern is chosen with respect to the phase of a 30 Hz frequency modulation on the auxiliary signal obtained by rotation of the directional radiation pattern such that they coincide in a given direction. By measuring at any point the phase difference between said signals, the azimuth at which this point is situated with respect to a given direction is known.

It is an object of the arrangement mentioned in the preamble to amplify one of the sideband signals generated in the transmitting device and to supply it to the antennas. To that end, the HF signal device is designed as a power amplifier and each of the impedances is designed as the parallel circuit of a load impedance formed by an antenna supply lead which is connected to the device and an absorbtion circuit that is provided with a control input.

To prevent undesired frequency components from being generated by an abrupt switch-over from one antenna to the subsequent antenna a more gradual switch-over is used. To that end the modulation signals which are supplied to the control inputs of the absorption circuit are in the form of half sines whose phase is preferably shifted over 180° with a transmitter with which only two subsequent antennas are activated simultaneously during switch-over. These modulation signals vary the impedance of the absorption circuits which are designed as PIN diodes and consequently the terminating impedances of the $\frac{1}{4}\lambda$-transformers. As a result, the impedance in situ of the common terminal is not constant, this results in a varying portion of the HF signal, which is supplied to this terminal by the power amplifier being reflected, which causes inter alia phase distortion in the power amplifier.

It is an object of the invention to make the impedance in situ of the common terminal independent of variations of the controllable impedances.

The arrangement according to the invention therefore includes an adder coupled to the modulation signal sources and the HF signal device is provided with a modulation means having a control terminal. The adder is coupled to the control terminal of the modulation means for causing the HF signal device to supply a carrier signal whose amplitude is modulated by the sum of the modulation signals.

The invention and its advantages will be further explained with reference to the embodiments shown in the drawings wherein:

FIG. 1 shows the circuit diagram of a power-dividing and modulation arrangement according to the invention, FIG. 2 shows the equivalent circuit diagram of the arrangement shown in FIG. 1, FIG. 3 shows an embodiment of the arrangement shown in FIG. 1 and FIG. 4 shows modulation signals produced in the embodiment shown in FIG. 3.

The circuit shown in FIG. 1 comprises a HF signal source 1 which supplies a carrier signal to a common terminal 3 via a transmission line 2. From terminal 3, the carrier signal is supplied, on the one hand, via a first $\frac{1}{4}\lambda$-long transmission line section 4, with output terminal 5, to a first adjustable impedance 6 and, on the other hand, via a second $\frac{1}{4}$ long transmission line section 7, with output terminal 8, to a second adjustable impedance 9. The impedances 6 and 9 are provided with control inputs 10 and 11 connected to signal sources 12 and 13 which supply modulating signals for varying the value of the impedances 6 and 9.

The terminating impedances of transmission line 2 are constituted by the parallel circuit of the input impedances of the $\frac{1}{4}\lambda$-long transformers which are formed by the $\frac{1}{4}\lambda$-long transmission line sections 4 and 7. These input impedances are equal to the impedances 6 and 9 as transformed by the $\frac{1}{4}\lambda$-long transformers 4 and 7. Owing to the fact that the values of impedances 6 and 9 are varied by the modulation signals, this terminating impedance also has a value of varying magnitude. Consequently, at the end of transmission line 2, a reflection of a varying value occurs which affects the proper operation of the HF signal source.

To avoid these reflections, the modulation signals produced by the modulation signal sources 12 and 13 are added together in an adder 14 and the resulting signal is supplied to a control terminal 15 of a modulation means, which is not shown in the Figure, in the HF signal device 1 for causing the HF signal source to supply a carrier signal whose amplitude is modulated by the sum signal.

The operation of this arrangement will be further explained with reference to the equivalent circuit diagram shown in FIG. 2.

This Figure shows the currents which flow, via the transmission line 2, the common terminal 3, the $\frac{1}{4}\lambda$-transformers 4 and 7 and the output terminals 5 and 8, to the impedances 6 and 9 owing to modulation signals which are supplied to these load impedances, and the associated voltages.

The voltages determined by the modulation signals across the load impedance are indicated by $E_1$ and $E_2$.

The input impedance of a $\frac{1}{4}\lambda$-long transmission line section is equal to the square of the characteristic impedance of the transmission line divided by the terminating impedance. The input impedance is therefore inversely proportional to the terminating impedance, so that the output voltage is proportional to the input current and vice versa. The input currents for the first ¼λ-transformer 4 and the second ¼λ-transformer 7 are indicated by $I_1'$ and $I_2'$ respectively, and the voltages across the load impedances are given by:

$$E_1 = A\, I_1' \tag{1}$$

and $$E_2 = A\, I_2' \tag{2}$$

The sum of the input currents is supplied to the common terminal 3 by the transmission line 2 and is equal to $$I_t = I_1' + I_2' \tag{3}$$

Substituting (1) and (2) in (3) gives:

$$I_t = (E_1 + E_2)/A \tag{4}$$

Under the control of the sum of the modulation signals the signal source 1 supplies a voltage equal to $$(E_1 + E_2) \tag{5}$$

From (4) and (5) it follows that the impedance in situ of the terminal 3 is equal to $(E_1+E_2)/I_t = A$.

By choosing the value of A to be equal to the characteristic impedance of the transmission line 2, this transmission line 2 is terminated reflection-free so that changes in the values of the variable impedances do not affect the proper operation of the HF signal device.

It should be noted that in the abovementioned analysis the currents $I_1$ and $I_2$, which flow through the impedances 6 and 9 may be taken as the starting point. Then the HF signal device 1 must also supply a voltage whose amplitude is modulated by the sum of the modulation signals to the common terminal 3.

Furthermore, prior art amplitude modulators may be used for the modulation means not shown in the Figure.

The arrangement shown in FIG. 1 may be used in a transmitter of a Doppler VOR navigation system. FIG. 3 shows the section for generating and amplifying a lower- or upper sideband signal and for sequentially supplying this signal to antennas of such a transmitter.

As shown in FIG. 3, the HF signal device 1 comprises a carrier signal generator 16 and an auxiliary signal generator 17 which produces a 9960 Hz signal. Both signal generators are connected to a modulator 18 which supplies an upper or lower sideband signal to a power amplifier 19. The output signal of amplifier 19 is supplied via transmission line 2 on the one hand via the ¼λ-transformer 4 to output terminal 5 and on the other hand via the ¼λ-transformer 7 to the output terminal 8. A group of 24 even-numbered antennas out of 48 antennas which are equidistantly distributed along the circumference of a circle is coupled to the output terminal 5 via an antenna supply lead 20 and the 24 odd-numbered antennas are coupled to the output terminal 8 via an antenna supply lead 21. Therein, in a manner not shown, the antennas are connected sequentially to the supply leads 20 and 21 to simulate a radiating element which moves along the circle circumference at a speed of 30 Hz. To prevent one abrupt switching from an antenna to an adjacent antenna, the amplitude of the signal supplied to the antenna is modulated by absorption circuits 22 and 23, namely with a half sine and a half cosine. With this arrangement, when a given antenna has reached the maximum radiation power, the next antenna is switched on. Half the cycle of the modulation signals later, both antennas radiate half the power and another half cycle of the modulation signals later said one antenna is switched off, the next antenna radiates the full power and the subsequent antenna is switched on etc.

The modulation signals are generated in a modulation signal generator 24 which supplies a sinusoidal signal of 360 Hz to two phase shifters 25 and 26 connected thereto. These phase shifters rotate the phase $+45°$ and $-45°$ and supply these signals via full-wave rectifiers 27 and 28 to absorption circuits 22 and 23.

The half sines and half cosines respectively of 720 Hz which are supplied to these absorption circuits 22 and 23 are shown in FIG. 4 and are indicated by 31 and 32.

The absorption circuits 22 and 23 comprise PIN diodes 33 and 34 respectively which are connected between the terminals 5 and 8 respectively and terminals 35 and 36 respectively. Terminals 35 and 36 are connected to ground via capacitors 37 and 38 which serve for blocking the modulation signals.

The modulation signals are supplied to terminals 35 and 36 via difference amplifiers 39 and 40. The instantaneous values of the resistances of the PIN diodes are determined by the instantaneous values of the modulation signal supplied thereto so that the HF carrier signals which are fed to the antennas via the transmission lines 20 and 21 have an amplitude behaviour which corresponds to the modulation signals 31 and 32 shown in FIG. 4.

The voltage between terminal 5 and ground is equal to $$E_5 = (\cos \phi)\, E \tag{6}$$

and the voltage between terminal 8 and ground is equal to $$E_8 = (\sin \phi)\, E \tag{7}$$

The load connected to the terminal 5 is equal to $$R_5 = 1/(1/R_1 + 1/R_o) \tag{8}$$

where $R_o$ is the impedance of the antenna supply lead and is equal to the characteristic impedance of this line when the latter is properly terminated and $R_1$ is the instantaneous value of the resistance of PIN diode 33. Likewise, the load connected to terminal 8 is equal to $$R_8 = 1/(1/R_2 + 1/R_o) \tag{9}$$

where $R_2$ is the instantaneous value of the resistance of the PIN diode 34 and $R_o$ is the impedance of the antenna supply lead 21.

The voltage $E_3$ of the common terminal 3 can be expressed in terms of the voltages $E_5$ and $E_8$ of the output terminals 5 and 8. Owing to the transforming action of the ¼λ-transformers:

$$E_3 = \sqrt{Z_{i4}/R_5}\, E_5 \tag{10}$$

and $$E_3 = \sqrt{Z_{i7}/R_8}\, E_8 \tag{11}$$

where $Z_{i4}$ and $Z_{i7}$ are the input impedances of the $\frac{1}{4}\lambda$-transformers 4 and 7, respectively. However, for a $\frac{1}{4}\lambda$-transformer $$Z_i = R_o^2/R_u \tag{12}$$

where $Z_i$ is the input impedance, $R_u$ the output impedance and $R_o$ the characteristic impedance of the transmission line sections 4 and 7. Substituting (12) in (10) and (11) gives:

$$E_3 = (R_o/R_5)E_5 \tag{13}$$

and $$E_3 = (R_o/R_8)E_8 \tag{14}$$

In addition, the modulation signals 31 and 32 are added in an adder 14 which results in the sum signal 41 shown in FIG. 4. The sum signal 41 is supplied via a difference amplifier 42 to the control terminal 15 of modulation means in the power amplifier 19 so that the latter supplies a HF signal to the common terminal having a modulation voltage $E_3$ which is equal to the sum signal 41. So it holds $$E_3 = E_5 + E_8 \tag{15}$$

From (15), (6) and (7) it follows that $$E_3 = (\cos\phi + \sin\phi)E \tag{16}$$

(16), (7) and (8) substituted in (13) gives $$E(\sin\phi + \cos\phi) = \{(R_1 + R_o)/R_1\}E\sin\phi \tag{17}$$

from which it follows that $R_1 = R_o \operatorname{tg} \phi$ and (16), (6) and (9) substituted in (14) gives $$R_2 = R_o \cotg \phi \tag{18}$$

The impedance in the common terminal is formed by the parallel arrangements of the input impedances of the $\frac{1}{4}\lambda$-transformers.

This impedance is equal to $$E_3 = 1/(1/Z_{i4} + 1/Z_{i7}) \tag{19}$$

(17) and (18) in (8) and (9) and these results in (12) give $$Z_{i4} = R_o(\operatorname{tg}\phi + 1) \tag{20}$$

and $$Z_{i7} = R_o(\cotg\phi + 1) \tag{21}$$

(20) and (21) in (19) finally gives $$R_3 = R_o \tag{22}$$

From this it follows that the transmission line 2 is terminated with the characteristic impedance $R_o$ and that no reflections occur there in spite of the varying impedances $R_1$ and $R_2$ of the PIN diodes 33 and 34.

To obtain accurate voltage signals in the connecting points 3, 5 and 8 these points are fed back via enveloping detectors which are designed as diodes 43, 44 and 34, at the negative input terminals of the difference amplifiers 42, 39 and 40 to the terminals 35 and 36 and the control input 15.

What is claimed is:

1. A power divider and modulator circuit comprising means for generating a HF carrier signal having an output connected to a common terminal, said carrier signal generating means including modulator means for modulating said carrier signal, at least two variable impedances, a separate quarter wavelength transformer connecting each of said variable impedances to said common terminal, first and second means each coupled to one of said variable impedances for producing a modulating signal for controlling the impedance value of the associated variable impedance, adder means having an output and a first and second input coupled to said first and second means, respectively, for producing an output signal proportional to the sum of said modulating signals and means for coupling said output of said adder means to a control input of said modulator means so that the amplitude of said carrier signal is modulated by a signal proportional to the sum of said modulation signals.

2. The circuit according to claim 1 wherein said coupling means includes a negative feedback circuit coupled between said common terminal and said control input of said modulator means.

3. The circuit according to claim 2 wherein said coupling means includes a difference amplifier having a first input connected to said output of said adder means, a second input coupled by an envelope detector to said common terminal and an output connected to said control input of said modulator means.

* * * * *